Sept. 20, 1938.  B. F. DEAVER  2,130,950
REVERSIBLE PLOW
Filed Feb. 25, 1938  2 Sheets-Sheet 1
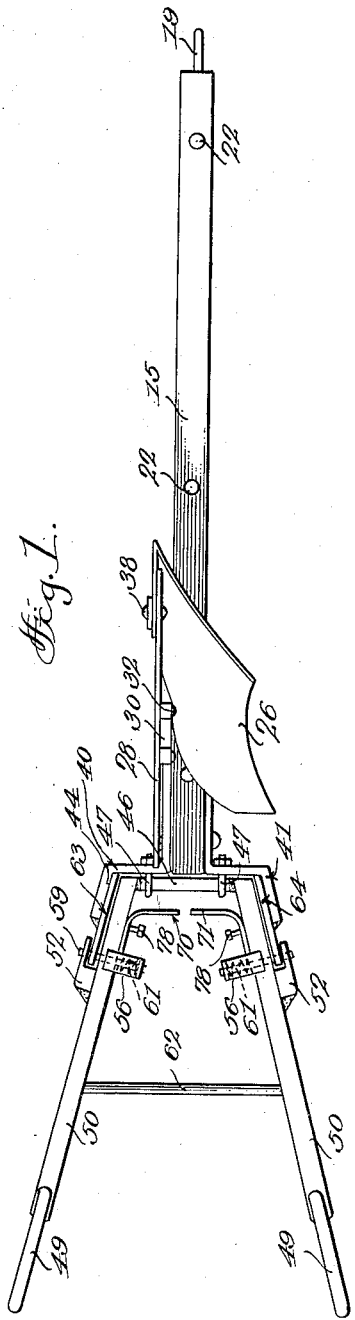
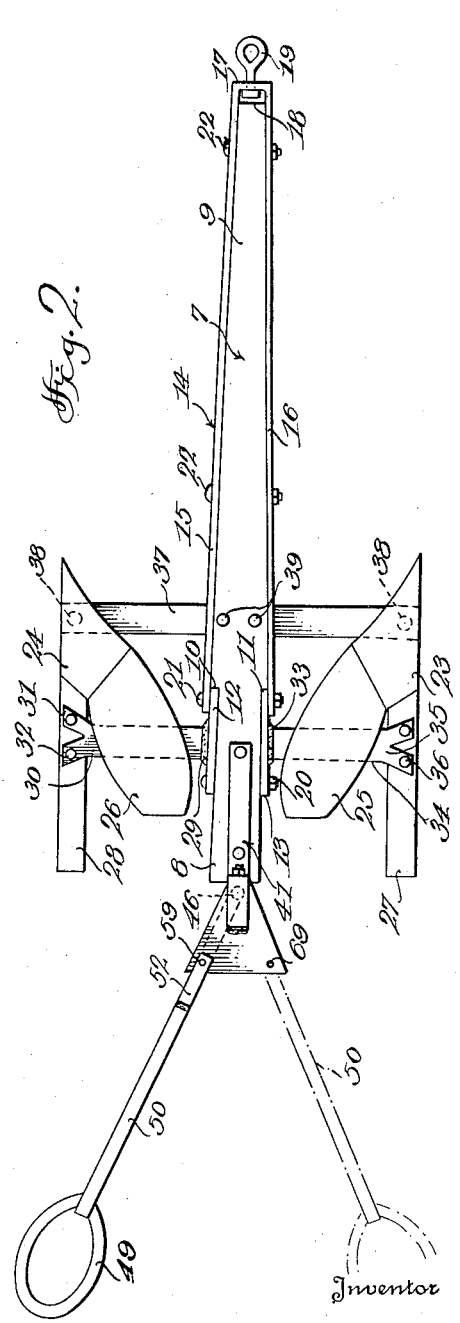
Inventor
Benjamin F. Deaver
By Kimmel & Crowell
Attorneys Sept. 20, 1938. B. F. DEAVER 2,130,950
REVERSIBLE PLOW
Filed Feb. 25, 1938 2 Sheets-Sheet 2
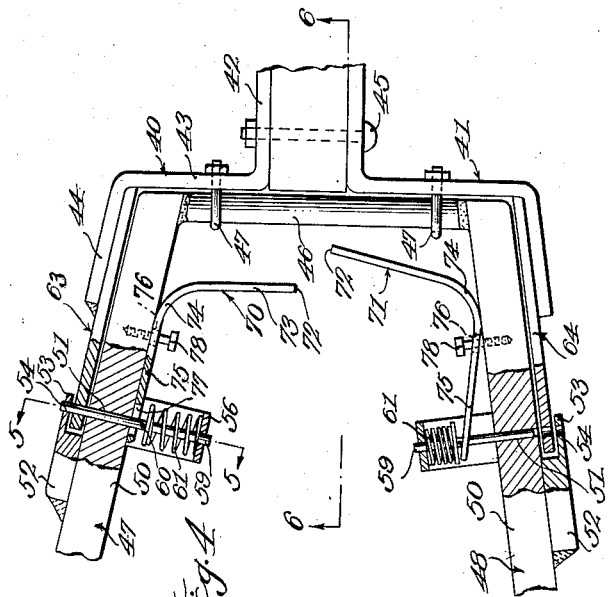
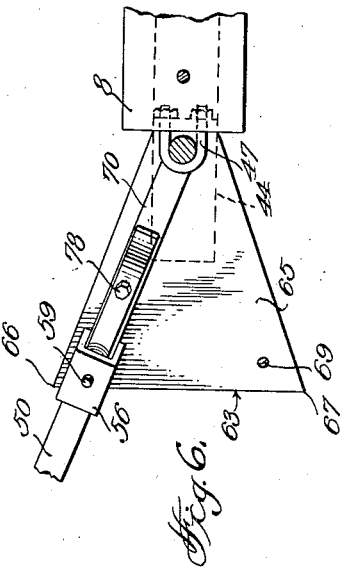
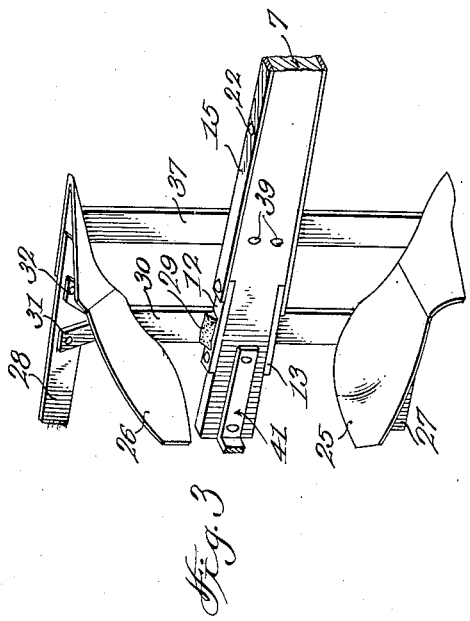
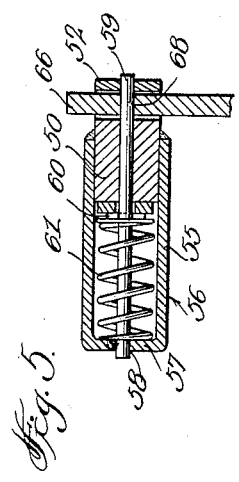
Inventor
Benjamin F. Deaver
By Kimmel & Crowell
Attorneys Patented Sept. 20, 1938

2,130,950

UNITED STATES PATENT OFFICE 2,130,950

REVERSIBLE PLOW

Benjamin F. Deaver, Breckenridge, Tex.

Application February 25, 1938, Serial No. 192,616

10 Claims. (Cl. 97—26)

This invention relates to a reversible plow.

The invention has for its object to provide, in a manner as hereinafter set forth, a plow of the class referred to for terracing grass lands and wood lands.

The invention further aims to provide, in a manner as hereinafter set forth, a plow of the class referred to meet the requirements of the Government to produce a furrow eight inches wide and four inches deep when terracing grass lands and wood lands.

The invention further aims to provide, in a manner as hereinafter set forth, a plow of the class referred to when travelling in one and in the other direction to successively produce furrows and whereby the dirt excavated when forming the furrows will be always thrown in a like direction.

The invention further aims to provide, in a manner as hereinafter set forth, a plow including right and left plowshares and an adjustable latchable handle means common to said shares.

The invention further aims to provide, in a manner as hereinafter set forth, a reversible plow whereby after the first furrow is plowed that in order not to deadhead back to the point of beginning the handles may be dropped at the end of the furrow and latched after which the plow is reversed and a second furrow plowed back thereby saving one-half of the time and labor in terracing the type of lands aforesaid.

The invention further aims to provide, in a manner as hereinafter set forth, a reversible plow for successively forming furrows when travelling in opposite directions in terracing a slope and meeting all requirements especially that whereby the dirt excavated must be thrown down the hill.

The invention further aims to provide, in a manner as hereinafter set forth, a reversible plow for the purpose referred to which is simple in its construction and arrangement, strong, durable, compact, conveniently adjusted, thoroughly efficient in its use, readily assembled, expeditiously repaired when occasion requires, and comparatively inexpensive to manufacture.

Embodying the foregoing aims, as well as others which may hereinafter appear, the invention consists of the novel construction, combination and arrangement of parts as will be more specifically described and illustrated in the accompanying drawings, wherein is shown an embodiment of the invention, but it is to be understood that changes, variations and modifications may be resorted to which fall within the scope of the invention as claimed.

In the drawings:

Figure 1 is a top plan view of the plow,

Figure 2 is a side elevation thereof,

Figure 3 is a fragmentary view in perspective,

Figure 4 is a fragmentary view, in sectional plan and upon an enlarged scale,

Figure 5 is a section on line 5—5, Figure 4, and

Figure 6 is a section on line 6—6, Figure 4.

The plow includes a longitudinal beam 7 disposed on its lower lengthwise edge. The beam includes a rear portion 8 of uniform width and a forward portion 9 of greater length than portion 8. The portion 9 tapers from its point of mergence with portion 8 to the outer end thereof. The inner end of portion 9 is of greater width than the forward end of portion 8. The latter is so disposed relative to portion 9 to provide the upper and lower lengthwise edges of the beam with shoulders 10, 11 respectively. Secured against the edges of portion 8 and abutting the shoulders 10, 11, as well as being flush with the inner ends of the upper and lower edges of portion 9, are reenforcing strips 12, 13 respectively. Mounted against the strips 12, 13, seated throughout against the upper and lower edge of portion 9 and extended from the outer end of beam 7 is an elongated V-shaped reenforcing member 14 of strap-like form. The top, bottom and closed outer end of member 14 are indicated at 15, 16 and 17 respectively. The said end 17 is spaced from the end 18 of beam 7 and is apertured for connecting thereto a hitch 19. A holdfast means 20 is employed for securing strips 12, 13 to the portion 8 of beam 7. A holdfast means 21 is employed for securing the strips 12, 13 and the inner end of member 14 to the portion 8 of the beam. Holdfast means 22 are employed for securing the member 14 to the portion 9 of beam 7.

The plow includes right and left plowshares 23, 24 respectively, moldboards 25, 26 respectively extending from the plowshares 23, 24 and runners 27, 28 respectively extending rearwardly from the shares 23, 24.

Welded, as at 29 to the strip 12 and extending upwardly therefrom, is a standard 30 having an enlarged V-shaped upper end 31 which is anchored against one side of the runner 28 by the holdfast means 32. Welded, as at 33 to the strip 13, is a depending standard 34 having an enlarged inverted V-shaped lower portion 35 which is anchored against one side of the runner 27 by the holdfast means 36. The plowshares 23, 24 are braced by a vertical bar 37 which is anchored at its upper and lower ends to the runners and to the plowshares by the anchoring means 38. The bar 37 is also secured, intermediate its ends to one side of the beam 7 by the holdfast means 39. The plowshares are disposed in diagonal relation with respect to the beam 7.

The plow includes a pair of oppositely disposed spaced stationary supporting brackets 40, 41 of like form and each of which includes a horizontally disposed forward end part 42, an intermediate part 43, which extends outwardly at right angles to the rear end of part 42, and a rear end part 44 which extends at an outward inclination from the outer end of part 43. The brackets 40, 41 are disposed on their lower lengthwise edges. The parts 42 of the brackets 40, 41 are arranged at opposite sides of the portion 8 of beam 7, and anchored to such portion by the holdfast means 45. The rear faces of the parts 43 of the brackets 40, 41 are substantially aligned with the rear end of the portion 8 of beam 7.

Arranged against the rear faces of the parts 42 of the brackets 40, 41 and extending across the rear end of portion 8 of beam 7 is a rockshaft 46. Carried by the said part 42 are spaced parallel combined suspending coupling and bearing elements 47 for shaft 46. The ends of the latter are secured to the forward ends of the inner faces of a pair of oppositely disposed, oppositely outwardly inclined handle members 47, 48 of like form including handgrips 49 at their rear ends.

Each handle member includes a bar 50 terminating at its rear end in a handgrip 49. The bar 50 between its transverse median and its forward end has an opening 51 disposed at a forward inclination with respect to the shaft 46. The outer side face of bar 50 has welded thereto, a block 52 having a reduced forward part 53 which coacts with the bar 50 to form a slidable coupling between the latter and a keeper element to be referred to. The part 53 is formed with an opening 54 which aligns with the opening 51. Welded or otherwise secured to the inner side of the bar 50 are the outer ends of the sides 55, of an inwardly extending inclined yoke 56, having its base or closed end 53 formed with an opening 58 aligning with the opening 51. Slidably mounted in the openings 51, 58 and of a length to extend through the opening 54, is a spring controlled releasable latching member 59 of bolt-like form, provided with a diametrically disposed combined stop and abutment pin 60 arranged between the bar 50 and base 57 of yoke 56. Surrounding the member 59 and interposed between the pin 60 and base 57 of the yoke 56, is a coiled controlling spring 61 for the latching member.

There is associated with the handle members, keeper elements which coact with the latching members for the purpose of maintaining said handle members at an upward inclination with respect to and when employing plowshare 23, or at an upward inclination with respect to and when employing plowshare 24. The handle members 47, 48 are connected together by a brace bar 62 whereby they will be moved in unison when adjusting them from angularly disposed set relation with respect to plowshare 23 to angularly set relation with respect to plowshare 24.

The keeper elements are indicated at 63, 64 and are welded to and extend rearwardly from the inner face of the parts 44 of the brackets 40, 41. The keeper elements are of like form and each consists of a triangular shaped plate 65 having its apex extending to the inner face of a part 43 of a supporting bracket. The base of the plate 65 extends above and depends below the beam 7. The plate 65 in proximity to its upper and lower corners 66, 67 respectively, is provided with a pair of openings 68, 69 respectively which are to selectively align with the openings 51, 58. The keeper elements are arranged between the forward portion of the outer sides of the handle members and the parts 44 of the brackets 40, 41. The keeper elements extend rearwardly from the said parts 44 and are arranged between the reduced portions 53 of the blocks 52 and the handle members.

The plow includes a pair of oppositely disposed foot operated releasing elements 70, 71 for the latching members 59. The elements 70, 71 are of like form and each consists of a rod 72 formed of front part 73 disposed substantially in transverse relation with respect to the plow, an intermediate curved part 74 for fulcruming on the inner face of a handle member and a rear part 75 for extending into a yoke 56. The part 75 intermediate its ends is formed with an opening 76 and at its rear end with an opening 77. The elements 70, 71 are loosely connected to the inner faces of the handle members by headed bolts 78 extending through the openings 76 and engaging in the handle members. The rear ends of the elements 70, 71 are arranged in the yokes 56 between the combined slots and abutment pins 60 and the inner sides of the handle members. The latching members 59 extending through the openings 68 in the elements 70, 71.

The shaft 46, handle members 47, 48, and brace 62 constitute a handle structure which is pivotally supported from the beam 7 at the rear of the latter. The handle structure is capable of being extended at an upward inclination with respect to beam 7 when using plowshare 23 to furrow and it is also capable of being extended at an upward inclination with respect to the beam 7 when using plowshare 24 to furrow. When the handle structure is disposed in its selected position with respect to a plowshare, it is releasably latched in such position.

It will be assumed that the handle structure in its selected position with respect to the plowshare 23, then each of the latching members and a keeper element would be in the position as shown in Figure 5. When foot pressure is applied to elements 70, 71 to release the handle structure, to permit of the latter droping for the purpose of changing its position from right to left plowshare or from left to right plowshare, each latching member and a releasing element would appear as is shown at the bottom of Figure 4.

What I claim is:

1. In a reversible plow, a right and left plowshare, a beam carrying supporting means for said shares, a handle structure pivotally connected to the beam for selective relation with said right and left plowshares, spring controlled latching members for and carried by said structure, and stationary keeper elements supported from said beam and having spaced means for selective coaction with said latching members for latching the handle structure in selective relation with respect to a plowshare.

2. In a reversible plow, a right and left plowshare, a beam carrying supporting means for said shares, a handle structure pivotally connected to the beam for selective relation with said right and left plowshares, spring controlled latching members for and carried by said structure, stationary keeper elements supported from said beam and having spaced means for selective coaction with said latching members for latching the handle structure in selective relation with respect to a plowshare, and releasing elements for said latching members carried by said handle structure.

3. In a reversible plow, a right and left plowshare, a beam carrying supporting means for said shares, a handle structure pivotally connected to the beam for selective relation with said right and left plowshares, spring controlled latching members for and carried by said structure, stationary keeper elements supported from said beam and having spaced means for selective coaction with said latching members for latching the handle structure in selective relation with respect to a plowshare, and said handle structure provided with means for slidably coupling the handle structure to said keeper elements.

4. In a reversible plow, a right and left plowshare, a beam carrying supporting means for said shares, a handle structure pivotally connected to the beam for selective relation with said right and left plowshares, spring controlled latching members for and carried by said structure, stationary keeper elements supported from said beam and having spaced means for selective coaction with said latching members for latching the handle structure in selective relation with respect to a plowshare, releasing elements for said latching members carried by said handle structure, and said handle structure provided with means for slidably coupling the handle structure to said keeper elements.

5. In a reversible plow, a right and left plowshare, a beam carrying supporting means for said shares, a handle structure pivotally connected to the beam for selective relation with said right and left plowshares, spring controlled latching members for and carried by said structure, and stationary keeper elements supported from said beam and having spaced means for selective coaction with said latching members for latching the handle structure in selective relation with respect to a plowshare, said keeper elements being in the form of spaced oppositely extending triangular shaped plates extending rearwardly from said beam, arranged exteriorly of said handle structure and having its said spaced means positioned in proximity to the rear end thereof, the apex of each of said plates being the forward end of the latter.

6. In a reversible plow, a right and left plowshare, a beam carrying supporting means for said shares, a handle structure pivotally connected to the beam for selective relation with said right and left plowshares, spring controlled latching members for and carried by said structure, stationary keeper elements supported from said beam and having spaced means for selective coaction with said latching members for latching the handle structure in selective relation with respect to a plowshare, and releasing elements for said latching members carried by said handle structure, said keeper elements being in the form of spaced oppositely extending triangular shaped plates extending rearwardly from said beam, arranged exteriorly of said handle structure and having its said spaced means positioned in proximity to the rear end thereof, the apex of each of said plates being the forward end of the latter.

7. In a reversible plow, a right and left plowshare, a beam carrying supporting means for said shares, a handle structure pivotally connected to the beam for selective relation with said right and left plowshares, spring controlled latching members for and carried by said structure, stationary keeper elements supported from said beam and having spaced means for selective coaction with said latching members for latching the handle structure in selective relation with respect to a plowshare, and said handle structure provided with means for slidably coupling the handle structure to said keeper elements, said keeper elements being in the form of spaced oppositely extending triangular shaped plates extending rearwardly from said beam, arranged exteriorly of said handle structure and having its said spaced means positioned in proximity to the rear end thereof, the apex of each of said plates being the forward end of the latter.

8. In a reversible plow, a right and left plowshare, a beam carrying supporting means for said shares, a handle structure pivotally connected to the beam for selective relation with said right and left plowshares, spring controlled latching members for and carried by said structure, stationary keeper elements supported from said beam and having spaced means for selective coaction with said latching members for latching the handle structure in selective relation with respect to a plowshare, releasing elements for said latching members carried by said handle structure, and said handle structure provided with means for slidably coupling the handle structure to said keeper elements, said keeper elements being in the form of spaced oppositely extending triangular shaped plates extending rearwardly from said beam, arranged exteriorly of said handle structure and having its said spaced means positioned in proximity to the rear end thereof, the apex of each of said plates being the forward end of the latter.

9. In a reversible plow, a beam, right and left plowshares supported therefrom in proximity to the rear thereof, a pair of oppositely disposed stationary supporting brackets secured to the sides of the beam at the rear end terminal portion thereof, spaced rearwardly extending triangular shaped plates having the smaller end portions thereof secured to said brackets, a handle structure pivotally connected to said brackets, oppositely extending spring controlled latching members carried by said structure, and said plates having spaced means for selective coaction with said latching members for latching said structure in selective relation with one of the plowshares.

10. In a reversible plow, a beam, right and left plowshares supported therefrom in proximity to the rear thereof, a pair of oppositely disposed stationary supporting brackets secured to the sides of the beam at the rear end terminal portion thereof, spaced rearwardly extending triangular shaped plates having the smaller end portions thereof secured to said brackets, a handle structure pivotally connected to said brackets, oppositely extending spring controlled latching members carried by said structure, said plates having spaced means for selective coaction with said latching members for latching said structure in selective relation with one of the plowshares, and oppositely disposed pressure operated releasing elements for said latching members fulcrumed on said structure.

BENJAMIN F. DEAVER.